(12) United States Patent
Chen

(10) Patent No.: US 9,174,794 B2
(45) Date of Patent: Nov. 3, 2015

(54) SPHERICAL CONTAINER ALLOWING RAPID EXTRACTION

(76) Inventor: Xiuxing Chen, Shanghai (CN)

(*) Notice: Subject to any disclaimer, the term of this patent is extended or adjusted under 35 U.S.C. 154(b) by 0 days.

(21) Appl. No.: 14/388,234

(22) PCT Filed: Jun. 11, 2012

(86) PCT No.: PCT/CN2012/000793
§ 371 (c)(1),
(2), (4) Date: Sep. 25, 2014

(87) PCT Pub. No.: WO2013/143039
PCT Pub. Date: Oct. 3, 2013

(65) Prior Publication Data
US 2015/0050393 A1      Feb. 19, 2015

(30) Foreign Application Priority Data

Mar. 26, 2012  (CN) .......................... 2012 1 0081572

(51) Int. Cl.
*B65D 85/804* (2006.01)
*A47G 19/16* (2006.01)
*A47J 31/06* (2006.01)

(52) U.S. Cl.
CPC ............ *B65D 85/8046* (2013.01); *A47G 19/16* (2013.01); *A47J 31/0689* (2013.01)

(58) Field of Classification Search
CPC ............ B65D 85/8046; B65D 85/8043; A47J 31/0689; A47G 19/16
USPC .................................. 99/295; 426/77, 78, 79
See application file for complete search history.

(56) References Cited

U.S. PATENT DOCUMENTS

| | | | | |
|---|---|---|---|---|
| 1,931,765 A | * | 10/1933 | Leever | 426/78 |
| 6,485,766 B2 | * | 11/2002 | Herod | 426/78 |
| 6,658,989 B2 | * | 12/2003 | Sweeney et al. | 99/315 |
| 8,381,635 B2 | * | 2/2013 | O'Brien et al. | 99/302 R |
| 2002/0078831 A1 | * | 6/2002 | Cai | 99/295 |
| 2003/0096038 A1 | * | 5/2003 | Cai | 426/77 |
| 2006/0280841 A1 | * | 12/2006 | Cai | 426/77 |
| 2009/0022855 A1 | * | 1/2009 | Steenhof et al. | 426/78 |
| 2011/0020497 A1 | * | 1/2011 | Steven et al. | 426/61 |
| 2012/0015080 A1 | * | 1/2012 | Roulin et al. | 426/110 |
| 2012/0141639 A1 | * | 6/2012 | Crescenzi | 426/112 |

FOREIGN PATENT DOCUMENTS

| | | | | |
|---|---|---|---|---|
| CN | 101977518 A | * | 2/2011 | 426/61 |
| CN | 102365214 | * | 2/2012 | 426/112 |
| CN | 102599818 | * | 7/2012 | 426/115 |
| WO | WO 2011004269 A1 | * | 1/2011 | 426/110 |

* cited by examiner

*Primary Examiner* — Rena L Dye
*Assistant Examiner* — Ashley Axtell

(57) ABSTRACT

A spherical container comprising an upper shell, a lower shell, a filter net and a connector. The connector, the upper shell and the lower shell form an airtight spherical cavity. The filter net is fixed within cavities of the connector. The upper surfaces and the lower surfaces of the connector are inwardly recessed to form upper locking slots and lower locking slots. The upper shell and the lower shell are formed respectively with upper locking portions and lower locking portions. Outer walls of the upper locking portions and of the lower locking portions are inwardly recessed to form upper grooves and lower grooves respectively. The connector is formed with upper hooks and lower hooks. Inner wall of the connector extends upwardly and downwardly to form buffer plates tightly fitted with inner walls of the upper shell and of the lower shell.

7 Claims, 2 Drawing Sheets

SPHERICAL CONTAINER ALLOWING RAPID EXTRACTION

BACKGROUND OF THE INVENTION

The present invention relates to a spherical container, and more specifically relates to a spherical container allowing rapid extraction. The spherical container allowing rapid extraction also enables convenient storage and extraction and achieves better extraction effect.

Coffee has become a beverage more and more popular during centuries of its development. Pressure brewed coffee is the most representative coffee beverage and it is now a brewed coffee which contains the best original taste. In the existing prior art, preparation of pressure brewed coffee requires specialized equipment and method. Since its preparation process is very elaborated and complicated, the taste of the pressure brewed coffee is much related to the skill of preparation. In particular, the taste is much related to the pressure, time and temperature during coffee extraction. Therefore, a cup of good tasting pressure brewed coffee costs a lot more time and money. Accordingly, pressure brewed coffee is not popular. Likewise, food ingredients such as tea leaves and soybean powder requiring extraction under high temperature and high pressure as in the case of coffee will only be made into brewed products not having a very good taste when the extraction of the food ingredients is done poorly due to improper skill and operation.

BRIEF SUMMARY OF THE INVENTION

In view of the aforesaid disadvantages now present in the prior art, the present invention provides a spherical container allowing rapid extraction, which also enables convenient storage and extraction and achieves better extraction effect. The spherical container allowing rapid extraction comprises a shell, wherein an airtight cavity is formed inside the shell for storing food ingredients. The shell is made by easily penetrable hard material.

A filter net is mounted in the cavity of the shell. The filter net separates the cavity into an upper cavity and a lower cavity mutually independent from each other.

The upper cavity forms part of a sphere of the spherical container allowing rapid extraction; the lower cavity forms another part of the sphere of the spherical container allowing rapid extraction.

The shell comprises an upper shell and a lower shell. The upper shell and the lower shell are removably connected with the filter net.

The spherical container allowing rapid extraction also comprises a ring-shaped connector connecting the upper shell and the lower shell. The connector, the upper shell and the lower shell together form the airtight cavity. The filter net is securely connected at inner cavities of the connector. The connector has inwardly recessed upper surfaces to form ring-shaped upper locking slots for locking. The connector also has inwardly recessed lower surfaces to form ring-shaped lower locking slots for locking. Upper locking portions tightly fitted with the upper locking slots are provided at an opening position of the upper shell. Lower locking portions tightly fitted with the lower locking slots are provided at an opening position of the lower shell.

Outer walls of the upper locking portions are inwardly recessed to form upper grooves. Outer walls of the lower locking portions are inwardly recessed to form lower grooves. The connector is provided with upper hooks tightly fitted respectively with the upper grooves at positions corresponding to the upper grooves. The connector is also provided with lower hooks tightly fitted respectively with the lower grooves at positions corresponding to the lower grooves.

Inner walls of the connector extend both upwardly and downwardly for a certain length to form buffer plates tightly fitted with inner walls of the upper shell and the lower shell.

The shell is generally made by plastic material, aluminum material or wood material.

The shell has a symmetric structure; a plane where the filter net is provided is a line of symmetry of the symmetric structure of the shell.

The upper shell has an outer shape of a part of a sphere of the spherical container allowing rapid extraction. The lower shell has an outer shape of another part of a sphere of the spherical container allowing rapid extraction.

The present invention has the following beneficial effects: The spherical container allowing rapid extraction comprises a shell and a filter net, and the filter net separates a cavity inside the shell into an upper cavity and a lower cavity mutually independent from each other, where food ingredients insoluble in water are put inside the upper cavity and food ingredients soluble in water are put inside the lower cavity; the food ingredients insoluble in water and the food ingredients soluble in water are separated by using the filter net and all the food ingredients are kept airtight against air from external environment so that the food ingredients can be stored for a longer period of time; when brewing coffee, a water inlet pipe of a coffee machine penetrates through a top end of the shell and a water outlet pipe of the coffee machine penetrates through a bottom end of the shell; since the food ingredients insoluble in water are put inside the upper cavity of the shell, space of the upper cavity remains substantially unchanged and its internal pressure does not have big changes during the brewing process in spite of the fact that the amount of food ingredients soluble in water in the lower cavity will gradually decrease during the brewing process; under high temperature and high pressure, better extraction effect of the food ingredients insoluble in water in the upper cavity can be achieved, and the brewed coffee will have a better taste. Further, the present invention adopts a structure allowing disassembly according to which the shell comprises an upper shell and a lower shell connected by a connector which is in a circular ring shape, and the filter net is securely connected in cavities of the connector; accordingly, food ingredients can be conveniently filled into the shell. Further, upper grooves are formed on the upper shell and lower grooves are formed on the lower shell; the connector is provided with upper hooks tightly fitted respectively with the upper grooves at positions corresponding to the upper grooves and lower hooks tightly fitted respectively with the lower grooves at positions corresponding to the lower grooves. Accordingly, the upper shell and the lower shell are prevented from being fallen off from the connector 4 because of excessively high pressure inside the shell, and an airtight condition is ensured at connecting positions. Besides, inner walls of the connector extend both upwardly and downwardly for a certain length to form buffer plates tightly fitted with inner walls of the upper shell and the lower shell; the buffer plates can effectively reduce pressure impact caused by high pressure on the connecting positions, and further prevent the upper shell and the lower shell from being fallen off from the connector because of excessively high pressure inside the shell. Since the filter net is positioned at a center part of the sphere, it has the largest possible surface area; hence, the surface area used for filtering is larger than that achievable by products of the same kind in the market, thereby increasing the filtering speed; compared with products of the same kind in the market, the present invention can finish brewing a cup of coffee within a shorter time period. Also, the design of hemispheric shape will not create any corner deprived of extraction; therefore, compared with products of the same kind, the present invention can achieve better extraction of food ingredients at every corner.

DETAILED DESCRIPTION OF THE INVENTION

The present invention is described further in detail below with reference to the accompanying drawings. References about directions and orientations in the following description are made based on the directions and orientations shown in FIG. 1.

Figure 1:
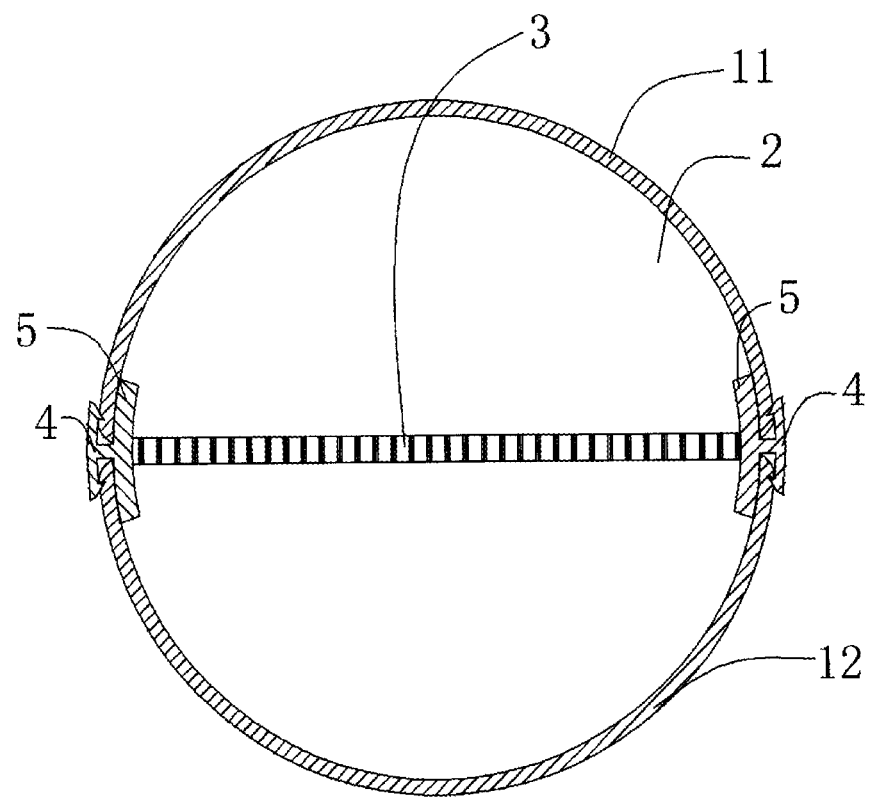
FIG. 1 is a sectional view of the spherical container allowing rapid extraction according to the present invention.
Figure 2:
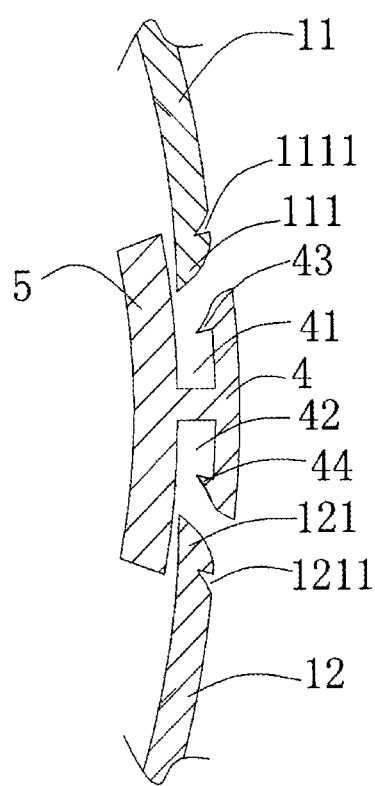
FIG. 2 is a schematic view showing a shell and a connector to be assembled together.

As shown in FIGS. 1-2, the spherical container allowing rapid extraction according to the present invention comprises a shell 1 and a filter net 3. An airtight cavity 2 is formed inside the shell 1 for storing food ingredients. The shell 1 is made by easily penetrable hard material. In general, the easily penetrable hard material is plastic material, aluminum material or wood material. The filter net 3 is mounted in the cavity 2 of the shell 1. The filter net 3 separates the cavity 2 into an upper cavity and a lower cavity mutually independent from each other. As such, when filling food ingredients into the spherical container allowing rapid extraction, food ingredients insoluble in water such as coffee powder, tea leaves and soybean powder are put inside the upper cavity, food ingredients soluble in water such as sugar, milk powder, food condiments and flavoring essence are put inside the lower cavity. The filter net 3 separates the food ingredients insoluble in water from the food ingredients soluble in water. Also, since the cavity 2 is airtight against air of external environment, food ingredients can be stored for a longer period of time. During brewing, a water inlet pipe of a coffee machine penetrates through a top end of the shell 1. A water outlet pipe of the coffee machine penetrates through a bottom end of the shell 1. Since food ingredients insoluble in water are put inside the upper cavity of the shell 1, space of the upper cavity remains substantially unchanged and its internal pressure does not have big changes during the brewing process in spite of the fact that the amount of food ingredients soluble in water in the lower cavity will gradually decrease during the brewing process. Under high temperature and high pressure, better extraction effect of the food ingredients insoluble in water in the upper cavity can be achieved, and the brewed coffee will have a better taste.

Further, the spherical container allowing rapid extraction also comprises a ring-shaped connector 4. The shell 1 comprises an upper shell 11 and a lower shell 12. The upper shell 11, the lower shell 12 and the filter net 3 are all removably connected with the connector 4. The connector 4, the upper shell 11 and the lower shell 12 together form the airtight cavity 2. The filter net 3 is securely connected at inner cavities of the connector 4. The connector 4 has inwardly recessed upper surfaces to form ring-shaped upper locking slots 41 for locking. The connector 4 also has inwardly recessed lower surfaces to form ring-shaped lower locking slots 42 for locking. Upper locking portions 111 tightly fitted with the upper locking slots 41 are provided at an opening position of the upper shell 11. Lower locking portions 121 tightly fitted with the lower locking slots 42 are provided at an opening position of the lower shell 12. These configurations facilitate quick filling of food ingredients into the shell.

Further, outer walls of the upper locking portions 111 are inwardly recessed to form upper grooves 1111. Outer walls of the lower locking portions 121 are inwardly recessed to form lower grooves 1211. The connector 4 is provided with upper hooks 43 tightly fitted respectively with the upper grooves 1111 at positions corresponding to the upper grooves 1111. The connector 4 is also provided with lower hooks 44 tightly fitted respectively with the lower grooves 1211 at positions corresponding to the lower grooves 1211. Accordingly, due to fitting between the upper grooves 1111 and the upper hooks 43 and fitting between the lower grooves 1211 and the lower hooks 44, the upper shell 11 and the lower shell 12 are prevented from being fallen off from the connector 4 because of excessively high pressure inside the shell 1, and an airtight condition is ensured at connecting positions.

Further, inner walls of the connector 4 extend both upwardly and downwardly for a certain length to form buffer plates 5 tightly fitted with inner walls of the upper shell 11 and the lower shell 12. The buffer plates 5 can effectively reduce pressure impact caused by high pressure on connecting positions, and further prevent the upper shell 11 and the lower shell 12 from being fallen off from the connector 4 because of excessively high pressure inside the shell 1.

The shell 1 is generally made by plastic material, aluminum material or wood material. The shell 1 has a symmetric structure. A plane where the filter net 3 is provided is a line of symmetry of the symmetric structure of the shell 1. The upper shell 11 has an outer shape of a part of a sphere (usually a hemisphere). The lower shell 12 also has an outer shape of a part of a sphere (usually a hemisphere). The upper cavity is part of a sphere (usually a hemisphere) and the lower cavity is also a part of a sphere. Since the filter net 3 is positioned at a center part of the sphere, it has the largest possible surface area. Hence, the surface area used for filtering is larger than that achievable by products of the same kind in the market, thereby increasing the filtering speed. Compared with products of the same kind in the market, the present invention can finish brewing a cup of coffee within a shorter time period. Also, the design of hemispheric shape will not create any corner deprived of extraction. Therefore, compared with products of the same kind, the present invention can achieve better extraction of food ingredients at every corner.

The above description is intended only to describe a preferred embodiment of the present invention. The present invention is not limited to the above embodiment. During actual implementation, there may be small and partial changes to the structure of the present invention. Any changes or modification belonging to the same field of art as the present invention and falling within the scope defined by the claims without deviating from the scope and essence of the present invention should also be included by the present invention.

What is claimed is:

1. A spherical container allowing rapid extraction comprising a shell (1), wherein an airtight cavity (2) is formed inside the shell (1) for storing food ingredients; the shell (1) is made by easily penetrable hard material; a filter net (3) is mounted in the cavity (2) of the shell (1); the filter net (3) separates the cavity (2) into an upper cavity and a lower cavity mutually independent from each other; the shell (1) comprises an upper shell (11) and a lower shell (12); the upper shell (11) and the lower shell (12) are removably connected with the filter net (3); the spherical container allowing rapid extraction also comprises a ring-shaped connector (4) connecting the upper shell (11) and the lower shell (12); the connector (4), the upper shell (11) and the lower shell (12) together form the airtight cavity (2); the filter net (3) is securely connected at inner cavities of the connector (4); the connector (4) has inwardly recessed upper surfaces to form ring-shaped upper locking slots (41) for locking; the connector (4) also has inwardly recessed lower surfaces to form ring-shaped lower locking slots (42) for locking: upper locking portions (111) tightly fitted with the upper locking slots (41) are provided at an opening position of the upper shell (11); lower locking portions (121) tightly fitted with the lower locking slots (42) are provided at an opening position of the lower shell (12).

2. The spherical container allowing rapid extraction as in claim 1, wherein the upper cavity forms part of a sphere of the spherical container allowing rapid extraction; the lower cavity forms another part of the sphere of the spherical container allowing rapid extraction.

3. The spherical container allowing rapid extraction as in claim 1, wherein outer walls of the upper locking portions (111) are inwardly recessed to form upper grooves (1111); outer walls of the lower locking portions (121) are inwardly recessed to form lower grooves (1211); the connector (4) is provided with upper hooks (43) tightly fitted respectively with the upper grooves (1111) at positions corresponding to the upper grooves (1111); the connector (4) is also provided with lower hooks (44) tightly fitted respectively with the lower grooves (1211) at positions corresponding to the lower grooves (1211).

4. The spherical container allowing rapid extraction as in claim 1, wherein inner walls of the connector (4) extend both upwardly and downwardly for a certain length to form buffer plates (5) tightly fitted with inner walls of the upper shell (11) and the lower shell (12).

5. The spherical container allowing rapid extraction as in claim 1, wherein the shell (1) is made by plastic material, aluminum material or wood material.

6. The spherical container allowing rapid extraction as in claim 1, wherein the shell (1) has a symmetric structure; a plane where the filter net (3) is provided is a line of symmetry of the symmetric structure of the shell (1).

7. The spherical container allowing rapid extraction as in claim 1, wherein the upper shell (11) has an outer shape of a part of a sphere of the spherical container allowing rapid extraction; the lower shell (12) has an outer shape of another part of the sphere of the spherical container allowing rapid extraction.

* * * * *